Patented Jan. 10, 1928.

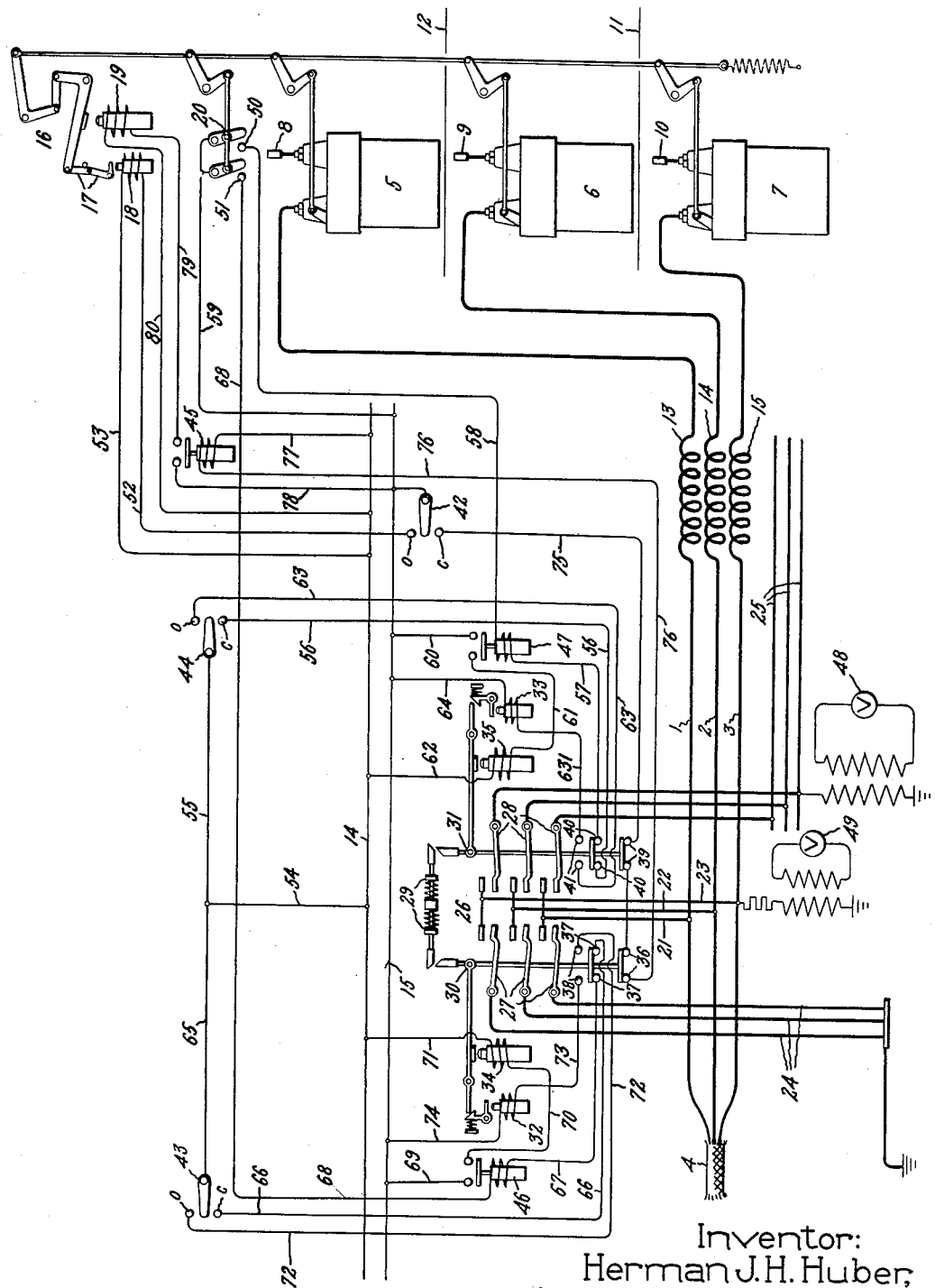

1,655,465

UNITED STATES PATENT OFFICE.

HERMAN J. H. HUBER, OF UPPER DARBY, PENNSYLVANIA, ASSIGNOR TO GENERAL ELECTRIC COMPANY, A CORPORATION OF NEW YORK.

GROUNDING AND TESTING ARRANGEMENT.

Application filed March 10, 1926. Serial No. 93,740.

My invention relates to improvements in grounding and testing arrangements for electric systems and more particularly to grounding and testing arrangements for installation in electric system stations and especially stations of polyphase systems embodying relatively high potential underground cable and stations in which the phases are isolated, whereby to insure the maximum of safety, not only to those operating and maintaining the system but also to the system itself and to facilitate testing.

My invention will be better understood from the following description taken in connection with the accompanying drawing and its scope will be pointed out in the appended claims.

In the single figure of the accompanying drawing, I have shown diagrammatically for purposes of illustration an embodiment of my invention as applied to a station of a polyphase electric system, only so much of the apparatus of the station being illustrated as is necessary clearly to convey the inventive idea.

In the system shown, the conductors 1, 2, 3 of a polyphase line such as a three-phase cable 4 are arranged to be connected through a circuit breaker comprising single pole units 5, 6, 7 to a source of supply not shown but indicated diagrammatically as busses 8, 9, 10. The circuit breakers 5, 6, 7 and the busses 8, 9, 10 are illustrated diagrammatically with the phases separated as by the floors 11, 12 or walls of the station. Reactors 13, 14, 15 in the conductors 1, 2, 3 may be similarly separated. This so called isolated phase arrangement of electric station apparatus is chosen for illustration since my invention is of particular utility where the station apparatus is widely distributed. The circuit breakers 5, 6, 7 are arranged to be actuated by an operating mechanism 16 which is restrained in the closed position by suitable means such as the over-set toggle 17. For controlling the operating mechanism, trip and closing coils 18 and 19 respectively, which are arranged to be energized from control busses 14 and 15, are provided. The operating mechanism is also arranged to control an auxiliary switch 20 which is open when the circuit breakers are closed, as shown, and vice-versa.

In accordance with my invention, I provide a grounding and testing installation comprising line terminals or leads 21, 22, 23 from the conductors 1, 2, 3 respectively, a grounding bus 24, a testing bus 25 and switching means 26 arranged to be operated to connect the line terminals to either the grounding bus or the testing bus only when the circuit breakers 5, 6, 7 are open.

The switching means 26 as shown comprises two switches 27 and 28 which are arranged to be operated respectively to connect the line conductors 1, 2, 3 to the grounding bus 24 and to the testing bus 25. In order to prevent the simultaneous closure of both of the switches, I provide suitable interlocking means such as a biased bar interlock 29 arranged to be actuated by the switch operating mechanisms 30, 31 so as to be movable by either, when both switches are open, into the path of the other when one of the switches is being closed. For controlling the operating mechanisms 30, 31, trip coils 32 and 33 respectively and closing coils 34 and 35 respectively are provided. The coils are arranged to be energized from the control busses 14, 15. The operating mechanism 30 is arranged to control auxiliary contacts 36 and 37 which are closed when the switch 27 is open and vice-versa, and auxiliary contacts 38 which are open when the switch 27 is open and closed when the switch is closed. Similarly, the operating mechanism 31 is arranged to control auxiliary contacts 39 and 40 which are closed when the switch 28 is open and vice-versa, and auxiliary contacts 41 which are open when the switch 28 is open and closed when the switch is closed.

For controlling the opening and the closing of the circuit breakers 5, 6, 7 and the switches 27 and 28, control switches 42, 43 and 44 respectively are provided. The opening and closing positions of these control switches are indicated by the letters $o$ and $c$. In order to avoid conducting the relatively large currents necessary for closing the circuit breakers and the switches through the contacts of the control switches, auxiliary control relays 45, 46, 47, which may be of the instantaneous opening, time delay closing type and which are arranged to be energized from the busses 14, 15 and to be controlled by the control switches 42, 43, 44 respectively may be provided. It is, of course, understood that the control switches 42, 43, 44 may be located in any suitable place but they are preferably located in a test room or compartment which may also contain the necessary indicating and testing instruments such as volmeters, only one of which, 48, is shown, ammeters, etc., which, as they form no part of my invention, are not further illustrated. The conductors 1, 2, 3 may be provided with suitable devices such as a voltmeter 49 for indicating grounds on the cable 4.

The grounding and testing busses 24 and 25 are preferably run throughout the station, so that all outgoing lines, such as the cable 4, provided with similar equipment, and also generators and other station apparatus, may be grounded or tested, as desired. For testing the feeders, such as the cable 4, a high potential source arranged to be connected to the testing bus 25 may be provided. For burning down faults which occur during testing or in service, a suitable source may also be arranged to be connected to the testing bus. For determining the location of faults, a source of direct current may be arranged to be connected to the testing bus.

Assuming that the parts are positioned as shown in the drawing and that a fault to ground occurs on the conductor 3 of the cable 4, an indication of the fault will be given by a decrease in the reading of the voltmeter 49. Then, in order to locate the fault, the cable 4 must be connected to the testing bus 25 through the switch 28, but for safety this must not and can not be done while the circuit breakers 5, 6, 7 are closed since the circuit of the control relay 47, even after the switch 44 is moved to the closing or c position, is open at contact 50 of the circuit breaker auxiliary switch 20. To open the circuit breakers, the control switch 42 is moved to the opening or o position, thereby completing the circuit of the circuit breaker trip coil 18 as follows: bus 15, control switch 42, conductor 52, trip coil 18, conductor 53 and bus 14, and causing the opening of the circuit breakers.

The testing switch 28 may now be closed by moving its control switch 44 to the closing or c position, thereby completing the circuit of the control relay 47 as follows: bus 14, conductors 54 and 55, control switch 44, conductor 56, auxiliary contacts 40, conductor 57, control relay 47, conductor 58, contact 50 of auxiliary switch 20, conductor 59 and bus 15. The control relay 47, being energized, completes the circuit of the closing coil 35 as follows: bus 15, conductor 60, contacts of relay 47, conductor 61, closing coil 35, conductor 62 and bus 14, thereby closing the switch 28. Upon closing, the operating mechanism 31 moves the bar interlock 29 into the path of movement of the operating mechanism 30 and holds the bar there so that the switch 27 cannot be closed. Also, when the switch 28 is closed, its auxiliary contacts 39, which are in the circuit of the control relay 45, are opened, thereby preventing the closure of the circuit breakers 5, 6, 7. When the cable 4 is connected to the testing bus 25, the fault may be burned down to ground and then located in a manner well known to the art.

Having located the fault, it is essential for the safety of those who have to repair the cable to have it grounded. This cannot be done until the switch 28 is opened, since it is not desirable for the safety of the operators and the apparatus to dead ground the testing bus through the ground bus 24. The control switch 44 is therefore moved to the opening or o position, thereby completing the circuit of the trip coil 33 as follows: bus 14, conductors 54 and 55, control switch 44, conductor 63, auxiliary contacts 41, conductor 631, trip coil 33, conductor 64 and bus 15 and causing the opening of the switch 28. This releases the bar interlock 29, which returns to the position shown so that the switch 27 can now be closed.

To close the switch 27, the control switch 43 is moved to the closing or c position, thereby completing the circuit of the control relay 46 as follows: bus 14, conductors 54 and 65, control switch 43, conductor 66, auxiliary contacts 37, conductor 67, control relay 46, conductor 68, contact 51 of the circuit breaker auxiliary switch 20, conductor 59, and bus 15. The control relay 46, being energized, completes the circuit of the closing coil 34 as follows: bus 15, conductor 69, contacts of relay 46, conductor 70, closing coil 34, conductor 71 and bus 14, thereby closing the switch 27. Upon closing, the operating mechanism 30 moves the bar interlock 29 into the path of movement of the operating mechanism 31 and holds it there so that the switch 28 cannot be closed. Also when the switch 27 is closed, its auxiliary contacts 36, which are in the circuit of the control relay 45, are opened, thereby preventing the closure of the circuit breakers 5, 6, 7.

After repairs to the cable 4 have been made, it may again be tested by opening the switch 27 and closing the switch 28 and then making the necessary tests, after which, if they are satisfactory, the cable can be restored to service by opening the switch 28 and closing the circuit breakers 5, 6, 7. To open the switch 27, the control switch 43 is moved to the opening or o position, thereby completing the circuit of the trip coil 32 as follows: bus 14, conductors 54 and 65, control switch 43, conductor 72, auxiliary contacts 38, conductor 73, trip coil 32, conductor 74 and bus 15, and causing the opening of the switch 27. The switch 28 can then be closed, as heretofore described, and the cable 4 tested. The switch 28 is then opened as heretofore described, and the circuit breakers 5, 6, 7 can be closed. To close the circuit breakers, the control switch 42 is moved to the closing or *c* position, thereby completing the circuit of the control relay 45 as follows: bus 15, control switch 42, conductor 75, auxiliary contacts 39 and 36 in series, conductor 76, relay 45, conductor 77 and bus 14. The control relay 45 being energized completes the circuit of the closing coil 19 as follows: bus 15, conductor 78, contacts of relay 45, conductor 79, closing coil 19, conductor 80 and bus 14, thereby causing the closing of the circuit breakers.

While I have shown and described my invention in considerable detail, I do not desire to be limited to the exact arrangement and application shown, but seek to cover in the appended claims all those modifications that fall within the true spirit and scope of my invention.

What I claim as new and desire to secure by Letters Patent of the United States, is,—

1. In a system of the class described wherein line conductors are connected to a source of supply through a circuit breaker, a testing installation comprising terminals connected to the line conductors on the line side of the circuit breaker, a testing bus, a switch for connecting the testing bus to the terminals, and interlocking means between the circuit breaker and the switch arranged to permit connection of the testing bus to the terminals only when the circuit breaker is open.

2. In a system of the class described wherein line conductors are connected to a source of supply through a circuit breaker, a testing installation comprising terminals connected to the line conductors on the line side of the circuit breaker, a testing bus, a switch for connecting the terminals to the testing bus, a switch for connecting the terminals to ground, interlocking means between the switches arranged to prevent simultaneous closure thereof, and interlocking means between the switches and the circuit breaker arranged to prevent the closure of each of the switches when the circuit breaker is closed.

3. In combination with the conductors of a polyphase circuit and an isolated single-pole circuit breaker for each phase of the circuit for connecting the conductors to a source of supply, a testing arrangement comprising a testing bus, a switch for connecting the testing bus to the line conductors, and interlocking means arranged to permit connection of the conductors to the testing bus only when the circuit breakers are open.

4. In combination with the conductors of a polyphase circuit and an isolated single-pole circuit breaker for each phase of the circuit for connecting the conductors to a source of supply, a testing arrangement comprising a testing bus, a switch for connecting the conductors to the testing bus, a switch for connecting the conductors to ground, interlocking means for preventing simultaneous closure of the switches, and interlocking means arranged to permit closure of only one of the switches only when the circuit breakers are open.

In witness whereof, I have hereunto set my hand this eighth day of March, 1926.

HERMAN J. H. HUBER.